United States Patent [19]

Hussmann

[11] Patent Number: 5,899,983
[45] Date of Patent: May 4, 1999

[54] METHOD FOR USING ELECTRONIC INFORMATION SERVICES WITH GUARANTEE OF THE ANONYMITY OF USERS IN RELATION TO THE OPERATORS OF SUCH SERVICES

[75] Inventor: Heinrich Hussmann, Tutzing, Germany

[73] Assignee: Siemens Aktiengesellschaft, Munich, Germany

[21] Appl. No.: 08/721,535

[22] Filed: Sep. 26, 1996

[30] Foreign Application Priority Data

Sep. 26, 1995 [DE] Germany .......................... 195 35 635

[51] Int. Cl.⁶ .............................................. H04N 007/173
[52] U.S. Cl. .................................................. 705/44
[58] Field of Search .......................... 380/25, 4; 705/44

[56] References Cited

U.S. PATENT DOCUMENTS

| | | | |
|---|---|---|---|
| 4,691,355 | 7/1987 | Wirstrom et al. ..................... | 380/23 |
| 5,339,361 | 8/1994 | Schwalm et al. ..................... | 380/23 |
| 5,410,598 | 4/1995 | Shear ................................... | 380/4 |
| 5,590,199 | 12/1996 | Krajewski, Jr. et al. ............. | 380/25 |
| 5,666,411 | 9/1997 | McCarty ............................... | 380/4 |
| 5,724,425 | 3/1998 | Chang et al. ......................... | 380/25 |
| 5,761,309 | 6/1998 | Ohashi et al. ........................ | 380/25 |

FOREIGN PATENT DOCUMENTS

| | | | |
|---|---|---|---|
| WO 9607256A1 | 7/1996 | WIPO ................................... | H04L 9/32 |

*Primary Examiner*—Allen R. MacDonald
*Assistant Examiner*—Michele Stuckey Crecca
*Attorney, Agent, or Firm*—Hill & Simpson

[57] ABSTRACT

Given a use-oriented billing of interactive video services, the method enables the guaranteeing of the anonymity of the service user in relation to the service operator. For this purpose, an authorization server is used that knows the identity of the customer but has no information concerning the consumption behavior in the video service.

20 Claims, 4 Drawing Sheets

METHOD FOR USING ELECTRONIC INFORMATION SERVICES WITH GUARANTEE OF THE ANONYMITY OF USERS IN RELATION TO THE OPERATORS OF SUCH SERVICES

BACKGROUND OF THE INVENTION

Electronic information services, such as for example what are called online information services, interactive video services, etc., are rapidly increasing in importance. The users of services of this sort have an interest in the observance of their rights of data protection, in particular their anonymity in relation to the operators of such information services. The protection of these user interests is very important, particularly in the area of electronic information services, since here there is an increased risk of abuse of user data due to particular technological possibilities.

To simplify the presentation of the present invention, the following discussion is mostly limited to interactive video services in broadband networks, although it is known without further teachings to one skilled in the art that the present invention can be used analogously in connection with arbitrary electronic information services and arbitrary communication networks.

Access to interactive video services is enabled for a subscriber by means of what is called a set-top box (STB), i.e. a communication terminal apparatus, arranged between the network terminal and the television apparatus. The set-top box (STB) (generally, the communication terminal apparatus) creates a connection to storage units for video information (what is known as a video server, generally, information server) via a broadband data transmission network (generally, a communication network), and controls the selection and reproduction thereof, dependent on inputs from the subscriber (user).

The retrieval of video and multimedia information from the video servers is subject to a fee in most cases, whereby a broad offering of private operators of such apparatus becomes possible. For this reason, these costs to the user of the services must be taken into account. The importance of the protection of data and of personal rights is also to be taken into account.

In the existing testing grounds for interactive video services, as well as in the previously available software for video servers, the identity of a user is checked at the video server. For this purpose the following data must be known to the video server: name, address or bank affiliation, secret number or password. By this means the operator of the video service can in principle associate the name of the user with his consumption behavior (e.g., films requested or film categories; frequency of use). Protection against the abuse of such information, e.g. for advertising purposes, can ensue exclusively via contractual regulations, but not through technological means.

SUMMARY OF THE INVENTION

It is an object of the present invention to provide a method for guaranteeing the anonymity of users of electronic information services.

In general terms the present invention is a method for using electronic information services with guarantee of anonymity of users in relation to the operators of such services. A connection is produced between a communication terminal apparatus of the user and an information server via a communication network. A connection is produced between a communication terminal apparatus of the user and an authorization server via a communication network. Identification information is transmitted to the authorization server by the communication terminal apparatus of the user. User authorization information is transmitted to a communication server, which information contains no information concerning the identity of the user. This use authorization information is transmitted to the information server by a communication terminal apparatus of the user, whereupon this server checks the validity of the user authorization information and, if the result of the check is positive, permits the user to use the information service.

Advantageous developments of the present invention are as follows.

The use authorization information consists of a transaction data word or a sequence o f transaction data words. These transaction data words can be used respectively only once for proof of the use authorization, and lose their validity after this unique use. A transaction data word corresponds to a determined monetary value or to a determinate use time unit.

A transaction data word gives authorization for the use of a particular offering.

The connection between the communication terminal apparatus of the user and the information server is formed such that the identity of the user remains concealed from the information server.

The validity of the use authorization information is limited in time.

The information server transmits billing information concerning used use authorization information to the authorization server, whereby such billing information contain no information concerning the type of use.

In this method, connections are created between at least one communication terminal apparatus of the user, an information server and an authorization server (AR) via a communication network (CN). Identification information is transmitted to the authorization server (AR) by a communication terminal apparatus of the user. Use authorization information is thereupon transmitted to a communication terminal apparatus of the user by the authorization server, which information contains no information concerning the identity of the user. This use authorization information is transmitted to the information server by a communication terminal apparatus of the user, whereupon this server checks the validity of the use authorization information, and, if the result of the check is positive, allows the use of the information service.

The present invention makes it possible to keep the identity of the user secret from the operator of the video service, but nonetheless allows a billing of fees in accordance with consumption. For this purpose, an authorization server is used that knows the identity of the customer, but has no information concerning the consumption behavior in the video service.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
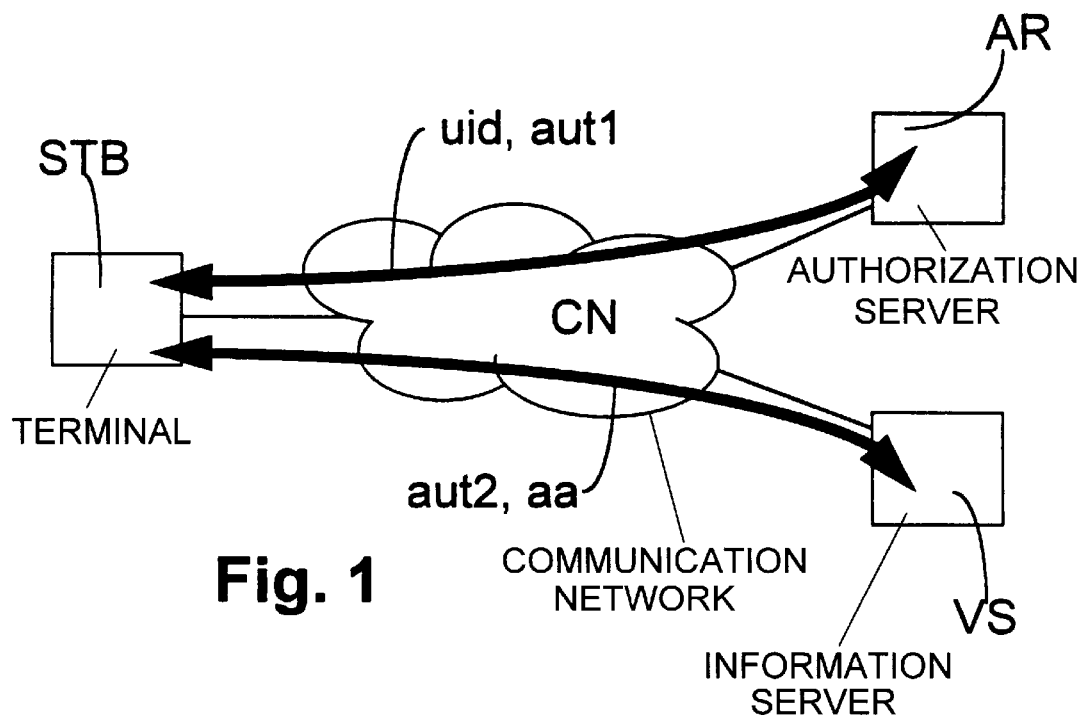
FIG. 1 schematically shows a basic configuration of a communication terminal apparatus, an authorization server and an information server, such as forms the basis of a preferred embodiment of the invention.

FIG. 1 shows the basic configuration. The user is connected with the overall system via the set-top box (STB). The set-top box (generally, the communication terminal apparatus) communicates both with the authorization server (AR) and with the information server via a data network (generally, a communication network). The manner in which these communication connections are set up is not pertinent for the present invention. However, a flexible connection setup, e.g. via switched connections, is desirable. In order to ensure the reliability of the authorization, an exchange of information between the information server and the authorization server is also necessary. As is explained more precisely below, for this purpose a one-sided flow of information from the information server to the authorization server is however sufficient. This takes place before the calling up of the actual video service and thus cannot contain any information concerning the use.

Figure 2:
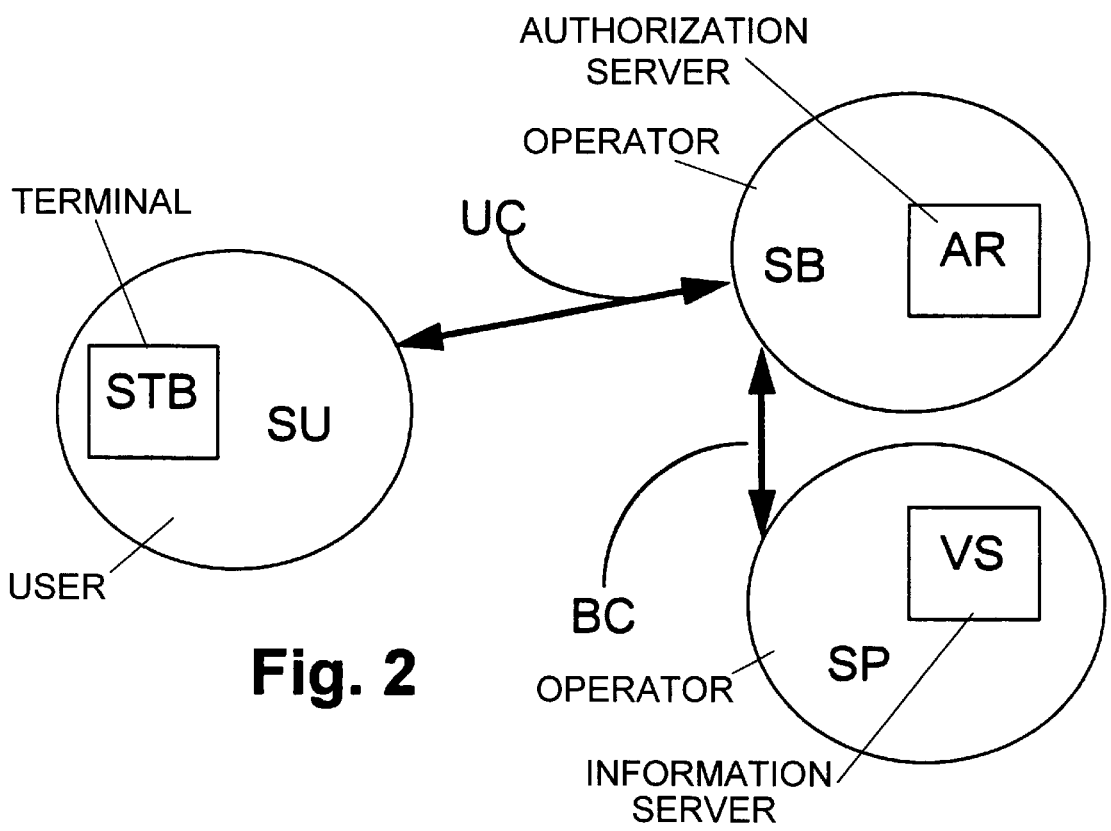
FIG. 2 schematically shows the arrangement between communication terminal apparatus and servers of the basic configuration and its operators, as well as the contractual relations between these.

FIG. 2 shows the contractual relations that exist between the operators of the different network components. The STB is operated in this sense by the service user (end customer), the information server by a service provider (e.g. for video on demand) and the authorization server by a neutral switching and billing company, e.g. the network operator or a credit card organization.

The service user is known by name to the authorization server. For identification, the authorization server assigns a secret number (or uses comparable mechanisms known to one skilled in the art). In the following, an identification via a secret number (PIN=personal identification number) is assumed. However, the invention is not limited to this exemplary embodiment. No direct contractual relations exist between the service user and the service provider. The billing for the use of the service ensues only via the authorization server. The fees incurred for the service are reimbursed to the service provider by the operator of the authorization server. Likewise, a form of the identification is used between the authorization server and the service provider that is anonymous, i.e. allows no connection back to the name of the service user. In the following it is assumed that arbitrarily selected passwords are used for this anonymous identification.

Figure 3:
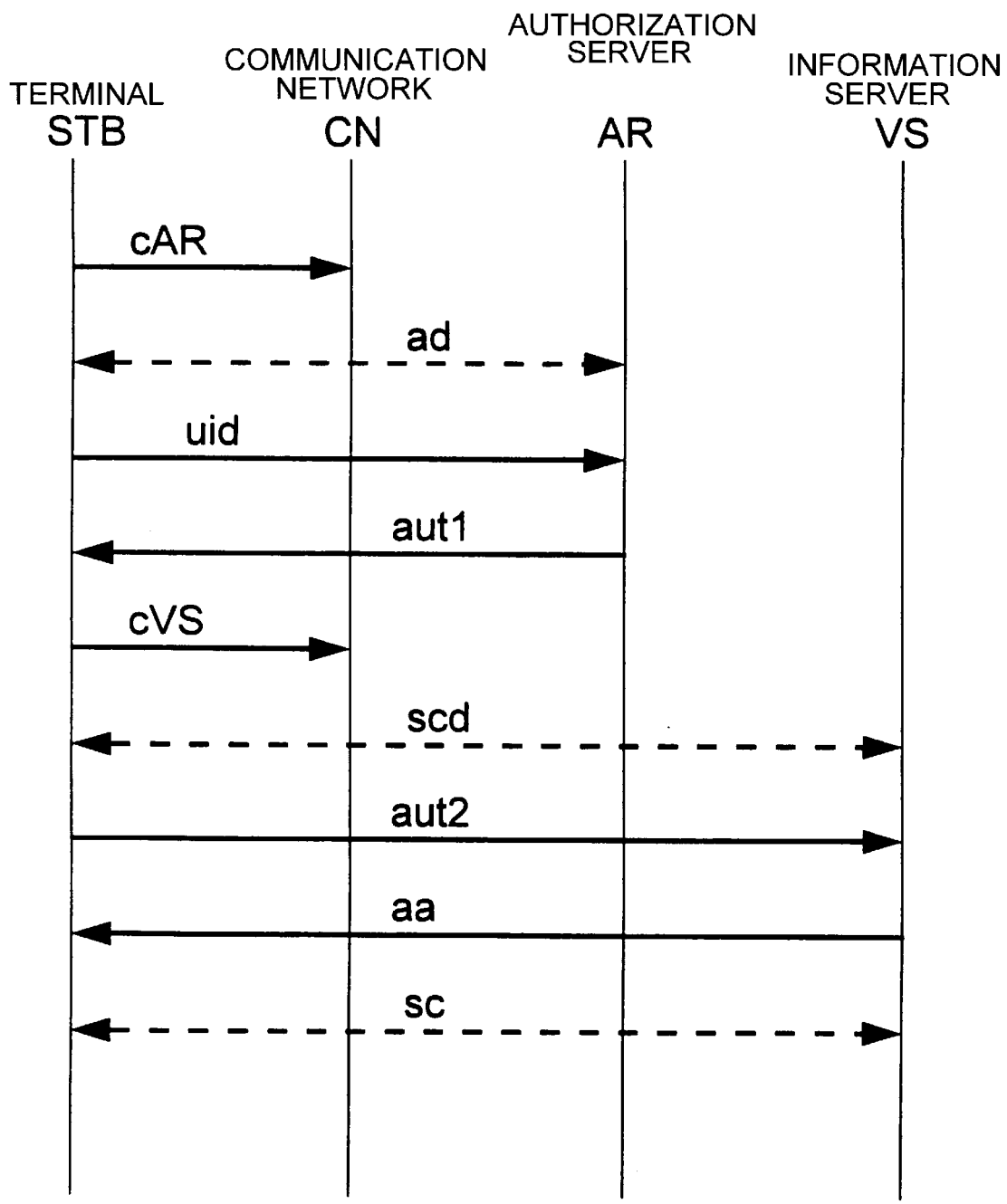
FIG. 3 schematically shows the sequence of the communication between the communication terminal apparatus and servers according to a preferred exemplary embodiment of the present invention.

FIG. 3 shows the course of communication between the components at the time at which the service is used, when e.g. a film is requested. Before the set-top box (STB) can connect itself with the information server, a selection process must have taken place among the accessible servers, e.g. by means of a computer specifically for service switching (sometimes called a "broker").

Before the information server can be addressed, a connection to the authorization server must first be set up (cAR). The service user identifies himself (uid) with his name and with the PIN agreed upon with the broker. A valid transaction data word (e.g. from a current table), or also several transaction data words, is thereupon transmitted to the set-top box (STB) (aut1). Transaction data words are standard in e.g. the German Datex-J telecom system (transaction numbers), e.g. for home banking applications. There, they can only be used once and incorrect input is limited to a few attempts. In connection with the present invention, one skilled in the art (with the help of the relevant literature, if warranted) can easily use other forms of a use authorization information without himself having to display inventive performance.

Subsequently, the connection to the information server can be set up (cVS), whereby the connection terminal number can remain hidden from the set-top box (STB) (CLIR=calling line identification restriction, supported in ISDN and B-ISDN). Before the execution of the actual service (sc), the authorization of the user is ensured in that the set-top box (STB) transmits the transaction data word (previously received from the authorization server) to the information server (aut2). The information server must now check the validity of the transaction data word and, dependent thereon, permit the user to use the service.

Figure 4:
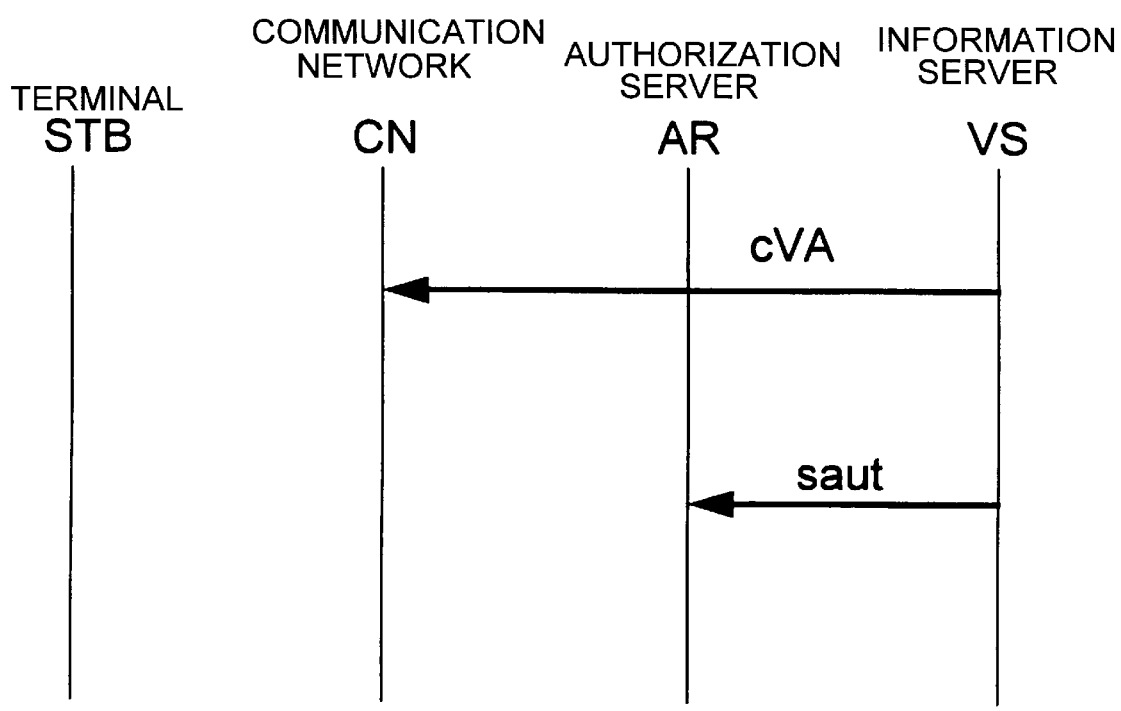
FIG. 4 schematically shows the sequence of communication between authorization server and information server before a use of a service by the subscriber, and during the arrangement of use authorization information (e.g. transaction data words) between authorization server and information server.

Of course, the above-depicted sequence depends on the knowledge of the allowable transaction data words by the information server. In the present invention, this is ensured in that the transaction data words are arbitrarily determined either by the information server or by the authorization server, and are matched via a communication between the information server and the authorization server. FIG. 4 shows a possible solution by means of an interaction that precedes the actual service use by a time interval, and can also be valid for several service uses. The video server thereby determines a basis for authorization (e.g. a table of arbitrarily chosen transaction data words) and communicates it to the authorization server (saut). Analogously, the initiative for the production of the transaction data words and the connection setup can also proceed from the authorization server. The solution shown in FIG. 4 is particularly secure against abuse, since the information server can still have no information about the future service use at the time when it establishes contact with the authorization server.

Figure 5:
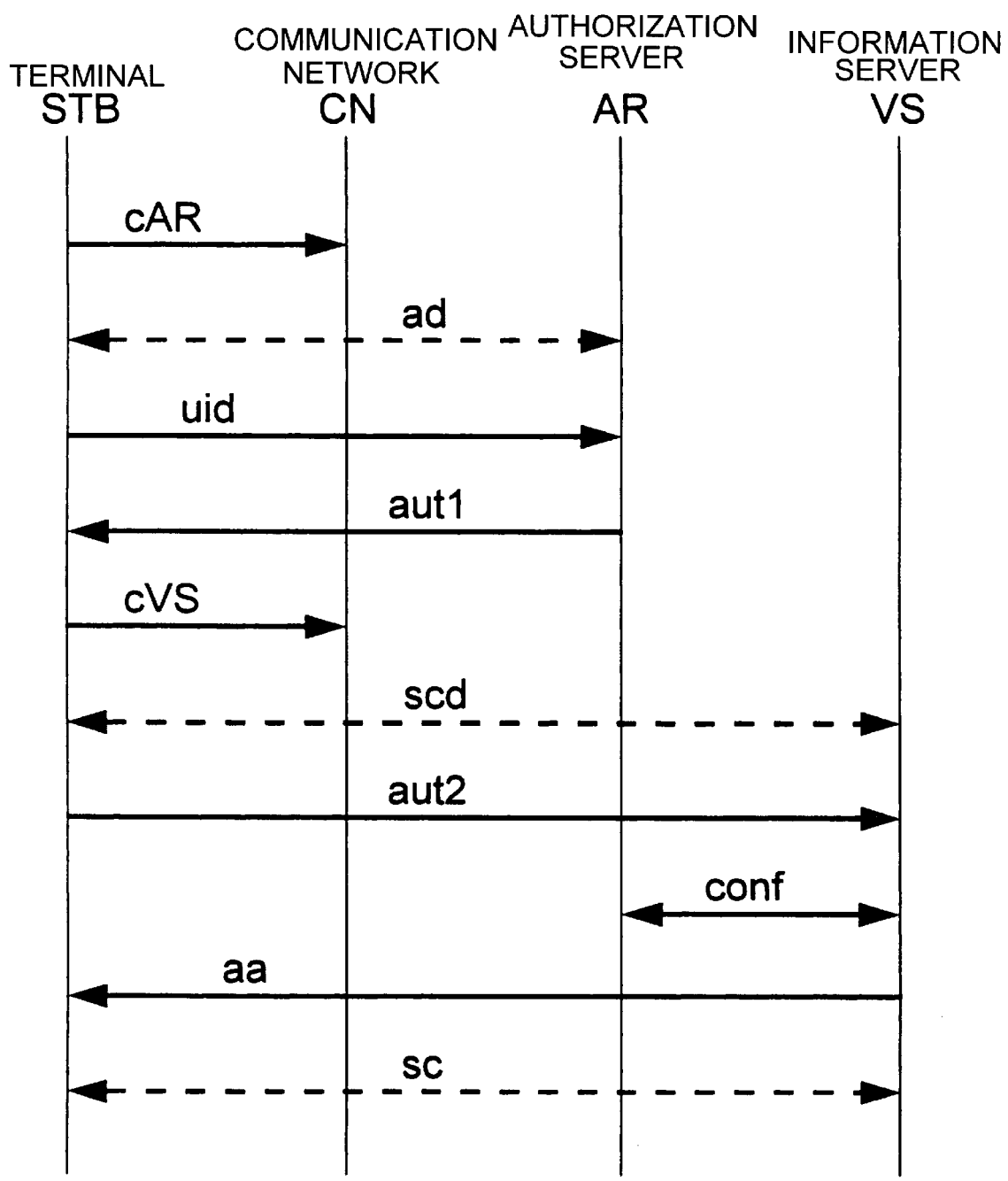
FIG. 5 schematically shows the sequence of the communication between authorization server and information server during an authorization callback during a use of a service.

A further solution is indicated in FIG. 5. It is also possible that the video server does not establish contact with the authorization server until the need arises (i.e. given a service use/film request). In this case, the authorization server can arbitrarily select the transaction data word given to the set-top box (STB), and the communication between the video server and the authorization server is a pure callback (conf).

Different further variants of the method used above are also possible, including among others the following.

The billing for the service in accordance with consumption can be ensured in various ways. The anonymity of the user is most effectively protected when the assigned transaction data words are conceived as "vouchers" for a determined quantity of services. Alternatively, the video server can communicate to the authorization server the total sum of the consumed services for a transaction data word (without reference to details of use such as time of use, film category, etc.).

The function of an authorization server can be combined with the ensuring of a regulated access to interactive multimedia services, as required in some circumstances by the legal framework (e.g. "level 1 gateway" in the USA). For this purpose, the network operator may allow only service providers who operate according to the method described above, and must operate the authorization server himself. For this purpose, it is particularly advantageous to combine the authorization server with the selection function for a video server ("broker").

Transaction data words can be made valid only for a limited time by means of the indication of "expiration data," in order to further limit the possibility of misuse.

The invention enables the use of interactive video services with the guarantee of the anonymity of the service user in relation to the service provider. This enables the maintenance of data protection conditions (only usage-related, no personal data at the service provider). In addition, the invention can represent an important distinguishing feature in market competition between service providers, since the service users can be offered maximally extensive protection against problems due to abuse of data.

Finally, in a network with regulated access to interactive video services, the present invention enables the use of simple and standardized methods for connection setup (e.g. automatic calling), without harmful effect on the control of the network operator.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for using electronic information services with guarantee of anonymity of users in relation to operators of such services, comprising the steps of:

producing a connection between a communication terminal apparatus of a user and an information server via a communication network;

producing a connection between the communication terminal apparatus of the user and an authorization server via the communication network;

transmitting identification information to the authorization server by the communication terminal apparatus of the user;

transmitting user authorization information to the communication terminal apparatus of the user by the authorization server, said user authorization information containing no information concerning identity of the user; and transmitting said user authorization information to the information server by the communication terminal apparatus of the user, whereupon the information server checks the validity of the user authorization information and, if the result of the check is positive, permits the user to use the information service.

2. The method according to claim 1, wherein the use authorization information consists of one of a transaction data word or a sequence of transaction data words.

3. The method according to claim 2, wherein said transaction data words are used respectively only once for validating user authorization, and lose their validity after this unique use.

4. The method according to claim 3, wherein a transaction data word corresponds to a determined monetary value.

5. The method according to claim 3, wherein a transaction data word corresponds to a determinate use time unit.

6. The method according to claim 2, wherein a transaction data word gives authorization for use of a particular offering by the information server.

7. The method according to claim 1, wherein the connection between the communication terminal apparatus of the user and the information server is formed such that an identity of the user is concealed from the information server.

8. The method according to claim 1, wherein the validity of the user authorization information is limited in time.

9. The method according to claim 1, wherein the information server transmits billing information concerning used use authorization information to the authorization server, said billing information containing no information concerning type of use.

10. A method for using electronic information services with guarantee of anonymity of users in relation to the operators of such services, comprising the steps of:

producing a connection between a communication terminal apparatus of a user and an information server via a communication network such that an identity of the user is concealed from the information server at all times;

producing a connection between the communication terminal apparatus of the user and an authorization server via the communication network;

transmitting identification information to the authorization server by the communication terminal apparatus of the user;

transmitting user authorization information to the communication terminal apparatus of the user by the authorization server, said user authorization information containing no information concerning identity of the user; and transmitting said user authorization information to the information server by the communication terminal apparatus of the user while still concealing the identity of the user, whereupon said information server checks the validity of the user authorization information and, if the result of the check is positive, permits the user to use the information service.

11. The method according to claim 10, wherein the use authorization information consists of one of a transaction data word or a sequence of transaction data words.

12. The method according to claim 11, wherein said transaction data words are used respectively only once for validating user authorization, and lose their validity after this unique use.

13. The method according to claim 12, wherein a transaction data word corresponds to a determined monetary value.

14. The method according to claim 12, wherein a transaction data word corresponds to a determinate use time unit.

15. The method according to claim 11, wherein a transaction data word gives authorization for use of a particular offering by the information server.

16. The method according to claim 10, wherein the validity of the user authorization information is limited in time.

17. The method according to claim 10, wherein the information server transmits billing information concerning used use authorization information to the authorization server, said billing information containing no information concerning type of use.

18. A method for using electronic information services with guarantee of anonymity of users in relation to the operators of such services, comprising the steps of:

produce a connection between a communication terminal apparatus of a user and an information server via a communication network such that an identity of the user is concealed from the information server at all times;

producing a connection between the communication terminal apparatus of the user and an authorization server via the communication network;

transmitting identification information to the authorization server by the communication terminal apparatus of the user;

providing at least one transaction data word corresponding to at least one of a predetermined monetary value, a predeterminate use time unit, and a particular offering by the information server;

providing user authorization information having of one of a single transaction data word or a sequence of transaction data words;

transmitting user authorization information to the communication terminal apparatus of the user by the authorization server, said user authorization information containing no information concerning identity of the user; and transmitting said user authorization information to the information server by the communication terminal apparatus of the user while still concealing the identity of the user, whereupon said information server checks the validity of the user authorization information and, if the result of the check is positive, permits the user to use the information service;

wherein said transaction data words are used respectively only once for validating user authorization, and lose their validity after this unique use.

19. The method according to claim 18, wherein the validity of the user authorization information is limited in time.

20. The method according to claim 18, wherein the information server transmits billing information concerning used use authorization information to the authorization server, said billing information containing no information concerning type of use.

* * * * *